Feb. 26, 1957

W. W. ODELL 2,783,187

CONTACTING FLUIDS WITH SOLIDS

Filed Dec. 1, 1954

William W. Odell
INVENTOR.

Feb. 26, 1957 W. W. ODELL 2,783,187
CONTACTING FLUIDS WITH SOLIDS
Filed Dec. 1, 1954 2 Sheets-Sheet 2

William W. Odell
INVENTOR.

United States Patent Office 2,783,187
Patented Feb. 26, 1957

2,783,187

CONTACTING FLUIDS WITH SOLIDS

William W. Odell, Amherst, Va.

Application December 1, 1954, Serial No. 472,345

22 Claims. (Cl. 196—52)

This invention relates to contacting fluids with solids. More specifically it deals with the contacting of a fluid or a plurality of fluids with solids which are of such small sizes that they can be contacted while disposed as a mass in a bed. Commonly the solids are in such a size range that they can readily be maintained in a fluidized state or a quasi-fluidized or semi-suspended condition while confined as a bed in a confining vessel. Still more particularly the invention relates to the means and method of maintaining a bed of small-size solids in a particular state of motion while a contacting fluid passes through the bed under chosen conditions of temperature pressure, and velocity of fluid flow.

It is well known that a fluid can be passed upwardly through a confined bed of subdivided, small-size solids in intimate contact with the surface of said solids, and that the bed condition changes as the velocity of the fluid stream increases. At low stream velocity the solids are at rest in contact with one another; at higher velocity the solids are in ebullient motion in the bed whereas at still higher velocities the solids become entrained and are carried out of the bed in the stream. Beds have been employed in the various conditions for promoting chemical reactions. For the purpose of controlling temperature in the bed of solids it has been found desirable heretofore to maintain the solids in a state of motion, confined in a chamber, in such a manner that the entrainment is not excessive, the particles (solids) commonly being in ebullient motion. Now, even though this procedure offers many advantages in promoting chemical reactions, cracking hydrocarbons, or otherwise contacting a fluid with the solids, a major disadvantage lies in the fact that the solids are mixing so rapidly from top to bottom and from bottom to top of the bed that any attempt to withdraw old or used solids such as spent catalyst, or to discharge particularly hot or cold solids from the remainder of the bed is not possible; the withdrawn solids are commonly a composite of the whole bed. Recognizing that it would be a marked improvement if freshly supplied solids could largely be so segregated from the used solids in the bed that the latter solids could be separately withdrawn attempts have been made to accomplish this by the employment of fixed baffles checker bricks and the equivalent. I have found that such arrangements not only inhibit smooth fluidization and increase power requirements but they do not permit the full utilization of the available space in the confining chamber. I now find that the use of a plurality of vertically spaced, rotating disk-like elements in the bed permits the accomplishment of this objective, namely, they retard top to bottom mixing of the solids with full utilization of the space allotted to the bed. This is true provided the disk-like members do not each completely cover a horizontal-sectional-area of the bed. This invention relates in particular to the means and method of maintaining a particular bed condition in contacting a fluid stream with solids; the solids may be immersed in a liquid or fluidized in a gasiform stream alone. The elements hereinafter referred to as "disk-like" elements are substantially segments of disk elements unless they are very small relative to the bed diameter under which conditions small disks may be employed preferably staggered between larger disk-like elements.

One of the objects of this invention is to regulate and control the rate of travel of fluidized solids from the feed zone to the discharge ports for said solids, as a fresh supply of solids is fed to said bed. Another object is to minimize or eliminate channeling of the fluid stream through the bed when conditions are such that channeling would normally occur. The tendency for channeling to take place is very marked when the fluid velocity is so low that the fluidization is insipient, that is, the velocity is insufficient or just barely sufficient to form a truly fluidized mass; this velocity is close to the minimum lifting velocity. Still another object is to prevent the well known "slug formation" which occurs when the ratio of bed depth to bed diameter is too great for the chosen solids. The term "slug-formation" refers to the passage of very large bubbles of the gasiform fluid up through the bed with very little contact of fluid with the solids; the bubbles extend over the complete diameter of the confining chamber. Again, one of the objects of this invention is to promote chemical reactions in a fluid stream as it passes through a bed of small-size solids at a velocity somewhat less than that normally required to completely fluidize the bed without channeling. Furthermore, it is an object to maintain a confined mass of small-size solids in a densely fluidized state and simultaneously interrupt the up and down motion of the solids for very brief periods of time in rapid succession over a plurality of sectional areas of the bed at different levels whereby rapid top to bottom mixing of the fluidized solids is eliminated. Other objects will become apparent from the disclosures hereinafter made.

Before referring to the drawings or otherwise detailing the invention attention is called for example, to the fact that in using dense, coarse-grain catalysts the minimum velocity of the fluid passing upwardly through the catalyst bed is somewhat greater than the minimum lifting velocity if the bed is kept in a densely fluidized state; in the latter bed the duration of contact of the fluid with the solids is dependent on the stream velocity, and attempts to appreciably increase contact time by increasing bed depth are rebuffed by the resulting difficulties with slug formation. On the other hand, when the velocity is appreciably decreased to provide longer contact time one is confronted with channeling. Now, when disk-like elements, each covering an area much less than that of the horizontal sectional area of the bed, are employed and are attached to an upright shaft staggered along said shaft and extending substantially radially toward the wall of the confining chamber it develops that by rotating the shaft it is possible to maintain a satisfactory condition in the bed, namely a bed free from channeling or slug formation over a wider range of stream velocities than is possible in the same bed without the shaft and disk elements. The faster the rate of rotation (R. P. M. of the shaft) the greater is the range of stream velocities that may be employed with satisfactory results. One unexpected result was obtained when the top disk was near but below the top surface of the bed, namely: at high stream velocities employing a gasiform stream whereby entrainment is normally severe, very little entrainment of the fluidized solids in the latter stream occurs. The shape, number and pitch of the disk-like elements as well as the revolutions per minute are important as will be described.

This invention is believed to be useful in promoting many different kinds and types of chemical reactions including hydrocarbon synthesis from CO and $H_2$, oxidation or reduction reactions, beneficiation of motor fuels, partial oxidation of coal, preparation or activation of carbon or of catalysts, treatment of ores such as sulfides, carbonates or other types, carbonization of carbonizable organic matter (liquids or solids), drying of solid materials such as sand, coal or other substance containing moisture, dehydrating hydrous materials, regenerating catalysts, promoting polymerization, alkylation, hydrogenation and cracking reactions. One of the major advantages of the application of this invention in promoting catalytic reactions is that it reduces the rate of recirculation of catalyst from the reactor to regenerator and back; this result is accomplished by virtue of the marked decrease in the rate of top to bottom mixing of catalyst solids in the fluidized bed by the use of the rotating elements. The latter type of mixing decreases with increasing speed of rotation of the elements and with increasing number of elements per unit of length of the supporting shaft. With an initial given pressure the flow of fluid through the bed is smoother and more uniform when the disks and shaft are rotating than when the disks are stationary and used merely as baffles.

The invention can be described most effectively by reference to the drawings.

Figure 1:
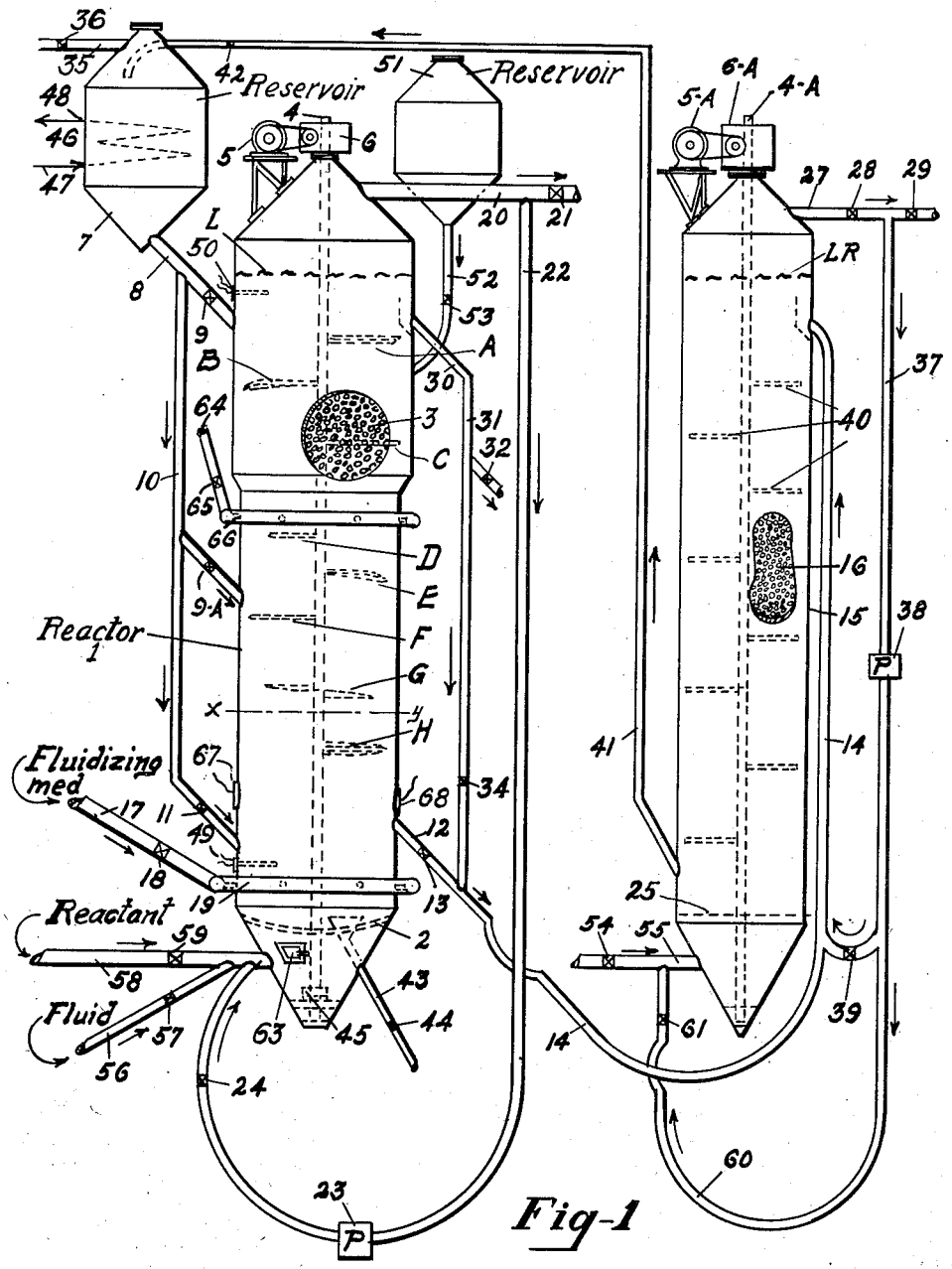
Figure 1 shows diagrammatically in elevation one embodiment of the invention in which a contact chamber or reactor is suitably connected with a regeneration chamber and with means for contacting solids with a fluid stream, each chamber is equipped with shaft supporting disk-like elements adapted to be rotated by said shaft.
Figure 2:
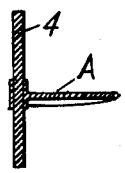
Figure 2 shows in vertical section a portion of shaft 4 with element A of Figure 1.
Figure 4:
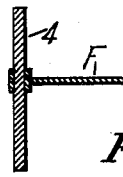
Figures 4 and 5 are, respectively, sectional and top views of element F of Figure 1 attached to shaft 4; this element is a flat segment of a disk.
Figure 3:
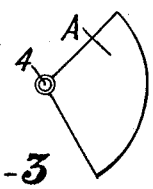
Figure 3 is a top view of the element A shown in Figure 2.
Figure 5:
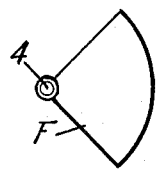
Figure 6:
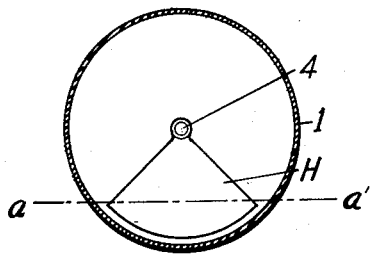
Figure 7:
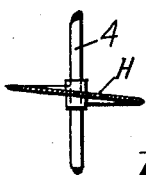

Figure 6 is top view through $x$—$y$ of Figure 1 of element H on shaft 4; it shows the element in relation to chamber 1. Figure 7 is a vertical sectional view of element H, through $a$—$a'$ of Figure 6, and also shows a portion of supporting shaft 4.

Figure 8:
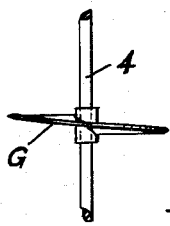

Figure 8 is a front view (elevation) of another form of disk element, such as is indicated at G of Figure 1, on its supporting shaft.

Referring to Figure 1, contact chamber or reactor 1 has a grid 2 for supporting a bed of solids 3 with level at L, a shaft 4 extending down into 3 with disk like elements A, B, C, D, E, F, G and H attached thereto and adapted to be rotated by virtue of a suitable electrically connected motor 5 connected to gear box 6 and shaft 4. Small-size solids which may be inert, reactive or catalyst substance, initially stored in reservoir 7, are supplied at a controlled rate through 8 and valve 9 to the upper portion of the bed 3, to a midway zone through valve 9–A, or to the bottom zone of 3 through 8, 10 and valve 11. Solids are discharged from 1 under control through offtake 12, valve 13 and are conveyed through conduit 14 to solids-regenerator or heater 15 which has a bed of such solids 16 with a level at LR. A fluidizing medium which may be or comprise reactant material is supplied to 1 through 17, valve 18 and pipe 19 under controlled pressure; the stream passes up through the bed out through offtake 20 and valve 21 although a portion of this discharged fluid may be conducted through conduit 22, pump 23 and valve 24 back to the base of chamber 1. Fluidizing medium, which may be or include a solids-regenerating agent is supplied to regenerator 15 through valve 54 and inlet 55; it passes up through grid 25, bed 16 and out through offtake 27 and valves 28 and 29; a portion of the stream thus discharged may be conveyed from 28 through conduit 37, pump 38 and valve 39 to conduit 14 as a means of elevating solids therein, and a portion of it may be conducted from 38 through 60 and valve 61 back to 15. Motor 5–A and gear box 6–A are connected to rotate shaft 4–A and the attached disk-like elements 40. Treated solids are discharged from adjacent the bottom of regenerator 15 through conduit 41 and valve 42 and are returned to reservoir 7. Solids may be discharged from the bottom of chamber 1 through offtake 43 and valve 44; they may be circulated from the upper zone of bed 3 through offtake 30, conduit 31 and valve 34 and conduit 14 to chamber 15; they may be removed from the system through 30, 31 and valve 32. Fluid discharged from reservoir 7 passes through offtake 35 and valve 36. Shaft 4 is supported at the bottom thereof by bearing box 45. The temperature of the solids passing through reservoir 7 is controlled by contacting them with element 46 therein; the temperature control fluid enters 46 through conduit 47 and exits through 48. The temperature in bed 3 is indicated by the use of thermocopules 49 and 50 which are suitably connected.

Small solids may be supplied to reactor 1 from auxiliary reservoir 51 through conduit 52 and valve 53. Fluidizing medium is supplied to 1 beneath grid 2 through 56 and valve 57 and also through 58 and valve 59. Ignition door 63 affords means for initially promoting combustion reactions in starting operations employing gasiform fluids. Means for supplying reactant material (high-boiling hydrocarbons for example) are provided by conduit 64, valve 65 and bustle pipe 66 whereby such a fluid material may be introduced into the bed in a zone between the top and bottom end zones. Electrodes 67 and 68 are provided for supplying supplementary heat to the bed; they are suitably connected but connections are not shown because electrodes per se are not claimed as part of this invention. Electric heating in this manner induces ionization which is also helpful in promoting chemical reactions. Sharp temperature control is readily maintained in the bed of solids with electric heating.

EXAMPLE 1

Drying mineral matter initially containing moisture, which matter is coarse sand in this example. Referring to Figure 1 dry sand (or fine size coke) is fed to reactor 1 from reservoir 51 through 52 by opening valve 53. Hot air or gaseous products of combustion are introduced through conduit 17 and valve 18 and motor 5 is started to rotate shaft 4. The supply of dry sand is sufficient only to fill 1 to the level L when the sand is fluidized. Valve 53 is now closed. The velocity of the air in 1 based on the empty chamber is 3.0 to 3.5 feet per second. Unless the sand is unusually rough the velocity 3.0 feet per second will just fluidize the sand; this condition will be manifest by a pressure manometer registering the differential pressure between the top and bottom of the sand bed; fluctuations are small after fluidization occurs. After a few minutes wet sand is supplied from reservoir 7 and conduit 8 by opening valve 9. Also valve 44 is opened to allow the discharge of dry sand from chamber 1 at a rate equal to the wet sand feed rate. The gas stream passing up through the bed of sand is discharged through conduit 20 and valve 21. It is necessary to keep a considerable portion of the bed 3 at a temperature above about 212° F. because wet sand is not fluidized. The rates of charging and discharging the sand are of course dependent on the rate of drying which is a function of the initial temperature of the hot gas supplied through 17 and 18; they can be calculated but in lieu of that the thermocouples 49 and 50 will indicate temperatures in the bed at the 2 different levels. Thermocouple 50 should register at least and about 215° F. whereas thermocouple 49 should preferably be (for a high throughput of sand) considerably above 215° F. Maximum permissible inlet temperature of the hot feed gas is below that which will damage the equipment or deleteriously affect the sand. In order to avoid discharging the sand at the temperature of the hot gas fed through 17, 18 and 19, the latter gas is supplied above grid 2 and cooler gas is supplied beneath the grid through 56 and 57. The sand is discharged at a temperature below that of the hot gas supplied through 17, 18 and 19. Recirculation of the vapors and gas discharged through 20, back to chamber 1 through 22, 23 and 24 is not particularly desirable in this example. If there is not an appreciable difference in temperature between the different levels of the bed in 1 the speed of the disk-elements A, B, C, D, E, F, G and H is too low and the shaft speed (R. P. M.) should be increased. Normally 100 to 300 R. P. M. is satisfactory but higher or lower speeds may be used. The sand may be discharged hot when so desired by limiting the amount of cooler gas supplied through 56 and 57. The bed of sand in this example is 15 feet deep and the diameter is 6 feet.

Before passing to another example attention is called to the fact that a modification of the foregoing procedure may be employed very effectively in drying the sand, namely, the major portion of the wet sand may be introduced directly into the hot zone of the bed from reservoir 7 through 8, 10 and 11 and a portion may be supplied, when so desired for outlet temperature control, through 8 and 9, the sand in this instance travels up through the bed and is discharged through 30, 31 and valve 32. One thousand cu. ft. of hot gas at 1020° F. passing out at 220° F. will completely dry approximately 160# of 5% moisture sand and discharge the sand at 220° F.

The procedures described are suitable for drying coal and other solids. It will be noted that with coarser silicious solids than $\frac{1}{32}$ inch diameter which was assumed in Example 1 the minimum fluidizing velocity of the fluid stream through chamber 1 is greater than for said sand. Likewise the velocity requirements for denser minerals is greater than for sand other factors being the same. This relationship is well understood in the practice employing fluidized solids technique.

EXAMPLE 2

Oxidation of solids adapted to be oxidized such as copper to CuO, lead sulfide to PbO; this example presents the details for CuO formation from Cu. Granular copper of average particle diameter $\frac{1}{64}$-inch and smooth surface is fluidized in chamber 1 of Figure 1; it is supplied to chamber 1 from reservoir 7, conduit 8 and valve 9 and a bed is maintained at level L. Air is the fluidizing medium and it is initially supplied under superatmospheric pressure through 17, 18 and 19. For a bed 12 feet deep the minimum pressure should be about 20 pounds per square inch since the drop in pressure through the bed may approximate 10 lbs. The operations are basically the same as in Example 1, however the oxidation is a chemical, exothermic reaction which may be expressed as follows:

(1)     $2Cu + O_2 = 2CuO + 125{,}600$ B. t. u.

The preferred method of operation is to feed the Cu to the top of the bed and discharge the CuO from the bottom through 43 and 44. The favorable temperature at which copper is readily oxidized in air is 400° to 500° C. although reaction starts below that temperature. When the copper solids are not supplied hot the air is initially supplied hot to start the reaction. When the latter solids are supplied hot it is particularly necessary to be on guard to avoid excessively high temperatures in the bed of solids 3. This is accomplished most readily and economically by supplying the air at normal temperature through 17, 18 and 19 or through 58 and 59 and recirculating offtake gas from 20 through 22, 23 and 24. The gas exiting at 20 is higher in $N_2$ than air but and has less oxidizing power per unit volume than air but has about the same heat capacity. Thus by adjusting the relative amounts of recycle and fresh feed air and by supplying air at a favorable temperature, the bed-temperature is readily controlled. The thermocouples 49 and 50 are employed to check on the latter temperature. Throughout the operation the disk-like members A to H are kept rotating in bed 3 by rotating shaft 4 by means of motor 5 and gear box 6. The rate of fresh feed of the solids is adjusted to equal the discharge rate through 43 and 44 which latter rate is based on the degree of oxidation desired and which is determined by tests of the solids discharged. It is desirable that the speed of rotation of the shaft be only that which is required to prevent rapid top to bottom mixing of the particles in bed 3. In adjusting this to a minimum the uniformity of oxidation of the solids should be noted; when the speed is too low a lack of uniformity of oxidation exists and some of the solids discharged will be completely oxidized and others will be incompletely or not oxidized at all. When the oxidation is insufficiently complete with all of the particles (solids) the rate of discharge is too fast for the given air supply and this rate must be reduced. The complete oxidation of 1000 lbs. of copper to CuO theoretically requires the consumption of approximately 250 pounds of oxygen; at 50% conversion of the oxygen per pass the air required is 500 pounds or 6500 cu. feet of oxygen equivalent to 31,100 cu. ft. of air. The actual conversion of the oxygen of the air may be more or less than 50% per pass varying with temperature, and inversely as to particle size and blasting rate. With the copper particles having the stated $\frac{1}{64}$-inch mean diameter the minimum lifting velocity based on the empty chamber 3 is about 3 to 3.8 feet per second. The amount of copper oxidized in the 6-foot diameter shell with air supplied at a velocity of 3.8 feet per second is 12,400 pounds per hour on the basis of 50% of the oxygen consumed on first pass. The total air passed through the 12-foot bed is 386,600 cu. ft. per hour. The rate of rotation of shaft 4 is determined as described above. The initial pressure at which air is supplied is preferably about 20 pounds; the drop in pressure through the bed is approximately 11 pounds. The waste gas is discharged through offtake 20 and 21. When this waste gas is not utilized the initial pressure of the feed air may be adjusted so as to avoid discharging waste gas into the atmosphere at unduly high pressure.

Ammonium sulfite crystals can be oxidized to the sulfate with air at relatively low temperatures practising as outlined above. Carbon can be burned off of the surface of contaminated used catalyst containing surface carbon by merely supplying the used catalyst from reservoir 7 through 8 and 9 and supplying air through 17, 18 and 19 or through 58 and 59, discharging the treated catalyst through 43 and 44. In this instance the reaction is exothermic and it is necessary to carefully watch bed temperatures to avoid overheating the catalyst. In the case of reduced metal catalyst it is further necessary to limit and control the oxidation and minimize oxidation of the reduced metal. The temperature normally should be kept in a range below the catalyst sintering point but above the ignition temperature of the deposited carbon which temperature is usually as low as 350° to 450° C. For the purpose of temperature control recycle of gas from 20 through 22, 23 and 24 may be practiced or $CO_2$ and/or steam may be introduced through 56 and 57. The $CO_2$ and steam react endothermically at temperatures above 1400° F. but function chiefly by virtue of heat carrying capacity at low temperatures.

It is believed that the described procedures are also applicable to the oxidation of BaO to $BaO_2$ at the well known temperature conditions and to the reduction of metal oxides by reacting them with a reducing gas at an elevated suitable temperature. Equations typifying such reactions are as follows:

(2)     $Fe_2O_3 + 3H_2 = 2Fe + 3H_2O$ endothermic
(3)     $Fe_2O_3 + 2H_2 + CO = 2Fe + CO_2 + 2H_2O$
(4)     $NiO + H_2 = Ni + H_2O$
(5)     $SnO_2 + 2H_2 = Sn + 2H_2O$
(6)     $MnO_2 + 2H_2 = Mn + 2H_2O$
(7)     $CuO + H_2 = Cu + H_2O$ Again, vapors such as naphtha, gasoline and the like may be treated by contact with clay, kaolin, activated alumina, acid phosphate of copper or other catalyst at an elevated temperature adapted for their beneficiation and/or alteration. Reactions of gases with one another may be conveniently promoted in a reactor such as chamber 1 of Fig. 1 substantially as described. Reacting CO with $H_2$ in hydrocarbon synthesis making principally gaseous or liquid products the mixture of CO and $H_2$ (ratio 1:1 to 1:2 or more) is introduced into chamber 1 through 17, 18 and 19, the bed of solids comprises an iron-chromium catalyst reduced from an oxidized state sized about 1/64-inch mean diameter. Conditions favorable for these reactions are:

| | |
|---|---|
| Depth of bed, feet=(18–20) | 24 |
| Initial pressure, pounds gage (150–400) | 300 |
| Superficial velocity at the temperature and pressure based on empty reactor, feet per second | 2 to 5 |
| Temperature, 550° F. to 900° F | 500 |
| The lower temperature for liquid products and higher temperature for maximum gaseous products. | |
| Ratio, Recycle to fresh feed volume (1.1 to 5.1) | 2.1 |
| Conversion of CO plus $H_2$ percent | 90 |
| Products more than 12.2 lbs. as condensable ($C_4$ plus) per MCF. of CO+$H_2$. | |

The spent catalyst is discharged through 12 and 13 and conveyed through conduit 14 to the regenerator 15. The bed 16 in this regenerator is kept in a fluidized state by controlling the rate of feed of the regenerating fluid which in this case is chiefly $H_2$ but which in some cases is chiefly nitrogen but with some oxygen, such as recycle gas from 27, 28, 37, 38, 60 and valve 61. In this manner carbon is burned off without damaging the catalyst. The waste gas from the regenerator passes out through 27, 28 and 29 whereas the regenerated catalyst is conducted out of 15 through conduit 41 and valve 42 to the catalyst reservoir for further use. The main products of this embodiment of this invention are recovered in the gasiform stream passing out of 1 through 20 and 21.

EXAMPLE 3

Contacting small-size comminuted solids with a fluid stream with classification of said solids which may be coal, minerals or other mixtures of materials of different buoyancies, with separation of the ash, bone or gangue substance from the more valuable coal or mineral matter. Specifically this example relates to treating coal.

Referring to Fig. 1, crushed coal, containing discrete particles of bone, shale or other matter of greater density than the coal substance, in a size range approximating ⅛ inch mean diameter, is fed to reactor 1 from reservoir 7 initially through conduit 8 and valve 9. A deep bed is established in 1 having a level L. The bed is densely fluidized by passing a gasiform fluid upwardly through it, entering through 58 and valve 59; this fluid may be air, a combustible gas, an inert gas or a combination of these gases. Air is the fluidizing agent in this example and it exits through 20. A portion of the fluid exiting from the reactor, or all of it, is advantageously recycled back to the reactor through conduit 22, pump 23 and valve 24. The shaft 4 with the attached disk elements is rotated at approximately 100 to 500 R. P. M. by starting motor 5 and controlling speed by gear box 6. The most buoyant particles (coal) rise to the top of bed 3 and the least buoyant non combustible solids segregate in the bottom zone of that bed and are discharged substantially continuously through 43 and valve 44 while the coal is removed from the top zone through 30, 31 and valve 32. A fresh supply of comminuted coal is now supplied to reactor 1 substantially continuously through 8, 10 and 9–A, valve 9 being closed, at such a rate that the level of bed 3 is maintained at L. The relative rates of discharge of solids from 1 through 30 and 43 is substantially proportional to the amounts of the coal and separated ash material in the feed; an occasional analysis of the feed and discharged streams of solids is a guide in making final adjustments. Usually coal containing 12 percent or more of ash can be so classified as described that the ash content of the coal in the stream exiting through 30, 31 and 32 is within the range 4 to 6 percent. The denser impurities exiting through 43 and 44 commonly contain a small amount of adherent carbonaceous matter. Approximate conditions, calculated for a reactor 6 feet mean inside diameter in the bottom half thereof are as follows:

| | |
|---|---|
| Superficial velocity of the air in the bottom zone of bed 3 in reactor 1, feet per sec | 5.0 |
| Pressure in bottom zone of bed 3, p. s. i. g | 20 |
| Air per minute to reactor 1, measured at 20 lbs. gage, cu. ft | 8,500 |
| Superficial velocity in top zone of bed 3, feet per sec. about | 3.2 |
| Rate of feed of coal per hr., tons, approxmately | 30 |
| Ash content of feed, percent | 12.4 |
| Ash content of discharged coal | 5.1 |
| Ash content of residue through 43 and 44, percent | 97.1 |
| Coal discharged per hour, lbs | 55,260 |
| Residue discharged per hr., lbs | 4,740 |

Employing finer-size feed coal a lower air velocity is employed. The velocity of fluid up through bed 3 is sufficient to maintain the denser and least buoyant particles in the zone of bed 3 adjacent the bottom thereof in a densely fluidized state. The diameter of the upper zone of bed 3 (diameter of bed 3 in the upper zone thereof) is so much greater than that of the bottom zone that the least buoyant solids of bed 3 are not fluidized in the former zone. This is one of the important features of this invention which, for clearness, is stated in different words as follows: the fluidizing stream is passed upwardly through a bed of increasing diameter at such a velocity that the more buoyant solids of the bed are densely fluidized throughout their travel upwardly in said bed, and the less buoyant solids are densely fluidized only in a zone of said bed below the top zone, while retarding violent ebullient motion in the bed by virtue of vertically spaced disk-like members rotating in said bed on a vertical shaft. This retarding effect is more pronounced with respect to the upward movement of the denser or less buoyant particles than the more buoyant particles; this is an aid to the separation of coal from ash in the example just cited. Because of the explosive nature of coal dust when suspended in air it is preferable to recycle offtake gas through 20, 22, 23 and 24 back to chamber 1 and it is also preferable to employ a fluidizing fluid which does not readily support combustion; aeriform fluids of this type include stack gas, $CO_2$, $N_2$, and combustible gas. It should be obvious, in view of Figure 1 that coal or other mineral matter may be dried and heated to a chosen temperature simultaneously as the described classification is promoted; this is accomplished by promoting the combustion of combustible matter, preferably a gas, in the fluidized bed. Thus a combustible gas may be admitted to 1 through 17, 18 and 19 and air through 56 and 57, the gas being burned in the air to generate the required heat.

EXAMPLE 4

ABSORPTION AND ADSORPTION OF GASES ON SOLIDS

Counter flow of the gasiform stream containing adsorbable material and a selected adsorbent is desirable and is provided. The adsorbent may be activated carbon, silica gel, activated alumina, bauxite, clay, iron oxide or other substance according to the material to be adsorbed or absorbed. Activated carbon is suitable for removing natural gasoline from natural gas or for removing organic sulfur impurities from impure gas; silica gel is suitable for the adsorption of acidic gases from a gasiform fluid stream containing such gases, such as $SO_2$, $H_2S$ and $CO_2$; silica gel alumina and carbon are each adapted for moisture removal. The circulating solids are selected and used in accordance with their known properties. When iron oxide is used for $H_2S$ removal adsorption is not the sole effect; the $H_2S$ reacts with $Fe_2O_3$ forming iron sulfide and water, subsequently the sulfided iron is reacted with oxygen (air) in the regenerator 15. The specific example is confined to the removal of natural gasoline from natural gas as follows:

*Composition of the raw gas*

| | Volume percent |
|---|---|
| $CH_4$ | 86.4 |
| $C_2H_6$ | 6.2 |
| $C_3H_8$ | 3.5 |
| $C_4H_{10}$ | 2.1 |
| $C_5$ and higher hydrocarbons | 1.0 |
| $N_2$ | 0.8 |
| | 100.0 |

This gas is passed upwardly through bed 3 entering through 58 and valve 59 and exiting through 20 and valve 21. Meanwhile bed 3, which is activated carbon, is maintained at level L and is supplied substantially continuously with the fresh active carbon from 7 through 8 and valve 9; this carbon passes downwardly through bed 3 and is discharged, at a rate substantially equal to the feed rate, from chamber 1 through 12, 13, and conduit 14 to regenerator 15.

| | |
|---|---|
| Size of activated carbon in bed 3, about, microns | 250 |
| Depth of bed 3, feet | 28 |
| Pressure in base of reactor 1, p. s. i. g | 250 |
| Bed density, lbs. per cu. ft | 22 |
| Mass velocity of natural gas in lower portion of bed 3, lbs. per sec. per sq. ft. of grid area, approximately | 0.210 |

*Composition of off-take gas through 20*

| | Volume percent |
|---|---|
| $CH_4$ | 91.8 |
| $C_2H_6$ | 6.3 |
| $C_3H_8$ | 0.6 |
| $C_4H_{10}$ | 0.3 |
| $C_5$ | 0.1 |
| $N_2$ | 0.9 |
| | 100.0 |

Yield of offtake gas approximately 94 volume percent. The rate of discharge of carbon from 1 through 12, 13 and 14, which is substantially equivalent to the feed of carbon from 7 through 8 and 9, is so controlled in this example that the outgoing gas (exiting through 20) contains 0.1 percent by volume of pentane and higher hydrocarbons. For greater adsorption the rate of circulation is increased whereas when more propane and butane are desired in the outgoing gas the carbon-circulation rate is decreased. The spent carbon conducted to the upper zone of bed 16 in regenerator 15 is regenerated and freed from adsorbed hydrocarbons as it passes downwardly through 15 counter current to a stream of hot stripping fluid introduced through 54 and 55. A known fluid may be used which may be or include superheated steam. The steam, laden with the stripped products exits through 27, 28 and 29 and is conducted to a condenser not shown where the water vapor is condensed and the hydrocarbons are recovered by known means. The regenerated carbon passes continuously or substantially so, through 41 and 42 to reservoir 7 wherein it is cooled by virtue of cooler 46 before it is returned to reactor 1. It is desirable that the rate of regeneration of the carbon in bed 16 be such that the amount of it discharged through 41 be sufficient to maintain bed level L in bed 3, thus the amount of stripping fluid (usually at a temperature above 150° C. but below about 500° C.) used is based on recirculation requirements. A test of the carbon discharged through 41 will indicate the degree of its regeneration and be a guide to the flow rate of the regenerating fluid to bed 16. During regeneration the disk elements 40 on shaft 4-A are rotated by motor 5-A to prevent top to bottom mixing of the carbon particles in bed 16. Vapors from offtake 27 may in part be circulated through 28, 37, pump 38 and valve 39 as the lifting medium for elevating carbon solids in conduit 14 to the upper zone of bed 16. Lower pressures may be employed in the system than the 250 pounds of this example. Preferably the pressure in reactor 1 is substantially the same as in regenerator 15 and, for a 28-foot bed should be more than about 5 to 7 lbs. gage in order to suitably fluidize the solids; 15 lbs. gage is usually a satisfactory working minimum for active carbon of the usual density, in the small-size range. Using other adsorbents of different size and or different density the known principles of fluidized-solids technique must be followed, in arriving at minimum pressures beneath the grids of chambers 1 and 15 and in establishing superficial stream velocities in these chambers. The rate of circulation of carbon through reactor 1 will vary with the results desired and with the carbon adsorption factor but will usually be within the range 100 to 1000 lbs. per minute per square foot of reactor grid area, the rate is less for the more active than for the least active carbons.

It may be apparent to one skilled in the art that the practice disclosed in Example 4 is applicable to the removal of dust and matter comprising condensed vapors from a gas stream by feeding a gasiform stream laden with these materials to reactor 1 through 58 and 59 and discharging the treated gas through 20 and 21. In this case the velocity of the fluid stream from 54 and 55 through bed 16 is sufficiently high to blow the dust, from the carbon supplied through 13 and 14 to bed 16, out through 27, 28 and 29 along with the vaporized matter, the cleaned carbon being returned to reactor 1 as described as a filtering medium. The rotating disk elements in the reactor markedly improves the filtering efficiency over that obtainable without these elements.

The general procedure outlined in Example 4 is applicable for the drying of moist gases, the absorbed moisture being expelled from the absorbent in regenerator 15 and the regenerated solids being recirculated back to the reactor; the chosen degree of moisture saturation of the gas being fixed by the solids circulation rate.

Attention is called to the fact that the rotating disk members provide the effect of operating with a plurality of stages in a single continuous bed; they also make possible a large decrease in the rate of solids circulation in promoting catalytic chemical reactions as well as in promoting adsorption and absorption employing fluidized-solids technique.

In conducting chemical reactions in a reactor it is of course usual that the reactions are either exothermic or endothermic; this must be recognized in operating the present process in such apparatus as shown in Fig. 1. The solids supplied to reactor 1 may advantageously be at or above reaction temperature when promoting endothermic reactions whereas they may advantageously be supplied at a lower than reaction temperature for exothermic reactions. The matter of suitably maintaining the temperature in the reaction zone by cooling applied within the bed or at the jacket of the reactor is not new and likewise the provision of elevated temperatures in the reactor bed by internal heating and by hot circulating solids is not new and is not claimed per se in this case but may be used as occasion warrants.

EXAMPLE 5

CRACKING HYDROCARBONS AT ELEVATED TEMPERATURES

This being an example of endothermic reactions, the circulating solids, cracking catalyst of the alumina-silica type, for example, are supplied to reactor 1 of Figure 1 at a temperature of 950° to 1500° F.—1200° F. in this particular case. The operation is much the same as described above; butane preheated and under 20 lbs. gage pressure is cracked by introducing it at a fluidizing velocity through 17, 18 and 19 and the catalyst is maintained densely fluidized in bed 3. The hot solids are supplied from 7 through 8 and 9 to an upper hot zone of the bed. The butane vapor is heated as it passes up through the bed and is cracked in the hot zone. The extent of cracking depends on the depth of the hot zone (the amount of hot solids in bed 3 at any one time), on the rate of feed of the butane through 17, 18 and 19, and on the temperature of the feed stock. Conditions suitable for cracking butane to gases are as follows with reference to Figure 1; quantities per hour per sq. ft. area of bed 3 adjacent the grate.

| | |
|---|---|
| Temperature of catalyst fed to reactor 1, ° F | 1200 |
| Rate of feed of catalyst; lbs. per hr. per sq. foot area | 2000 |
| Butane fed per hr. per sq. ft. of area, lbs | 400 |
| Spent catalyst out through 12, 13 and 14, lbs. per hr. per sq. ft | 2000 |
| Kind of fluidizing agent fed to bed 3 through 58 and 59 | Air |

*Composition of product gas; percent by volume*

| | |
|---|---|
| $CO_2$ | 3.9 |
| $CO$ | 1.1 |
| $CH_4$ | 15.6 |
| $C_2H_4$ | 31.0 |
| $C_2H_6$ | 10.3 |
| $C_3H_6$ | 2.5 |
| $C_3H_8$ | 2.4 |
| $C_4H_{10}$ | 0.2 |
| $H_2$ | 13.0 |
| $N_2$ | 20.0 |
| | 100.0 |
| Calorific value, B. t. u. per cu. ft | 1010 |
| Cu. ft. of air per hr. through 58 and 59, per sq. ft. of area | 2200 |
| Volume of make gas per hr. per sq. ft. of area, cu. ft | 8050 |
| Carbon deposited per hr. per sq. ft. of area, approximately, lbs | 24 |
| Carbon burned in reactor 1 per hr. per sq. ft. area, lbs | 12 |

Carbon burned in regenerator is the balance not burned in the reactor. Outlet temperature of catalyst, as discharged from reactor, ° F., approximately 800. Air supplied to regenerator 15 is sufficient to burn the carbon carried over with the catalyst and raise the temperature of the catalyst to 1200° F. and fluidize bed 16. Recycle gas from 27 and 28 is employed to control temperature and fluidization, passing through 38, 60, 61 and 55.

In this operation, within the scope of this invention, one can very materially lower the $N_2$ content of the make gas by recirculating more of the catalyst solids and promoting more combustion in the regenerator and correspondingly less, with zero as a limit, in the reactor. The amount of carbon deposited (evolved) during the cracking reactions depends on the temperature maintained in the reactor bed hot zone and the rate of flow of the reactant stream in bed 3 and on the depth of bed 3 hot zone. High temperatures and a deep bed favor completeness of cracking whereas high velocity and short time of contact minimizes both carbon formations and completeness of cracking. The air supplied to bed 3 will oxidize carbon or, in lieu of carbon, it will oxidize the feed hydrocarbon to an equivalent extent. The inventor knows that it is not new to recirculate hot cracking catalyst. A new and improved result is obtained when the cracking is so conducted that the products of reaction are not passed as freshly generated back to the reaction zone by ebullient motion of the catalyst. Sharper control is obtainable by the use of the rotating disk members in the reactor. The R. P. M. of the shafts 4 and 4–A may be as low as 100 or lower with noted retardation of the up and down mixing through the beds. In this manner substantially true counter flow contact is obtained in a single, deep continuous bed of densely fluidized solids; the spent catalyst substantially free of fresh or regenerated catalyst is removed from reactor 1 through 12 and 13 at a rate adapted to maintain the level L of bed 3, and is conducted through 14 to regenerator 15 and there it is regenerated by fluidizing fluid stream containing a gasiform oxidizing agent (air in this example) as it passes downwardly therein while the carbon is burned off. The fluidizing fluid exits through 27 and 28 whereas the regenerated catalyst is returned to 1 through 41, 42 and reservoir 7. The same counterflow conditions are maintained in regenerator 15 as in reactor 1. Heavier hydrocarbons than butane may be heat treated and/or cracked substantially in the manner described above and by adjusting the speed of rotation of shaft 4 and bed temperature, and maximum yields of olefins and/or aromatic compounds may be obtained.

One skilled in the art will be able to modify results by varying the pressure in the system, nature of the raw material treated, depth of hot zone, character of catalyst, temperature in the hot zone, duration of exposure time of the reacting stream in the hot zone and rate of catalyst feed. Destructive hydrogenation, namely cracking of hydrocarbons accompanied by hydrogenation is best accomplished under superatmospheric pressure, and hydrogen, other than that directly present from cracking, may be introduced into bed 3 as a stream in amounts desired, through 56 and valve 57 or through 17, 18 and 19. Recovered hydrogen, from reaction products may be recycled to maintain a chosen partial pressure of hydrogen in the fluidizing stream passing up through bed 3.

Somewhat summarily and for the purpose of clearness the inventor calls attention to some of the important features of the invention as follows: The maintenance of rotating disk-like members in a fluidized bed of solids to prevent or retard rapid top to bottom mixing of the solids and reaction products in the bed is believed to be new in the art. These members are not necessarily true disks but are preferably more like segments of disks some of which may have a spiral pitch adapted to give a lifting effect to the bed solids. Employing a plurality of these members, the smoothness of fluidization is improved when one or more of the disks are of lesser radial length than adjacent disks (as shown at D of Figure 1). A large plurality of disks normally is not required in a single bed, but a large number may be used when so desired and would be indicated when a slow flow rate of solids through the bed is desired. A hot zone, in which the solids are at a higher temperature than in an adjacent zone, may readily be maintained in the bed by controlling the amount and temperature of the hot solid supplied to the bed; by regulating and controlling the amount of combustion or other exothermic reactions promoted in the fluidizing stream in the bed; and by selection the desired zone of the bed into which hot solids are fed. A hot zone is maintained in the upper portion of the bed, referring to Figure 1, when the hot solids are supplied thereto through 8 and 9, and when a moderate amount of combustion is promoted in the bed by incorporating a relatively small amount of combustion supporting fluid in the fluidizing stream passing up through the bed. It will be noted that in the ordinary fluidized bed the temperature is rather uniform throughout the bed because of the ebullient motion of the solids in the bed; this is particularly true when the bed is continuous as shown in Figure 1. The rotating disks make possible temperature control in the different zones. It will be noted that the rotating disk members function in like manner when the solids are fluidized dry or submerged in a liquid. Accordingly the inventor does not limit the invention to dry fluidization. The well known Oxo process is an example of the use of a submerged catalyst; the rotating disk elements are the means for improving that process by permitting zone temperature control and by permitting directional flow of the catalyst.

It is understood that the fluidizing medium introduced into reactor 1 of Figure 1 through 17 and 18 or through 56 and 57 or through 58 and 59 is chosen for the effect desired and may contain one or more reactant substances according to the results sought and the materials being treated. Thus the solids, fluid or both may be treated as a result of contacting the fluid with solids under chosen conditions of temperature, pressure, feed rates, fluid velocity and depth of the bed of solids. In the drying of solids in a gasiform fluid stream combustion may be promoted in said stream in said bed facilitating rapid drying; the fuel consumed in this step may be gaseous, liquid or solid. Likewise in carbonizing coal combustion reactions may be promoted in the gasiform fluid stream in the fluidized bed of coal in process. Any desired amount of fluid reaction products may be recirculated.

Having described this invention so that one skilled in the art can practice it, I claim:

1. The process of contacting small-size solids with a flowing fluid while they are confined as a deep, upright, continuous bed in a contact chamber, comprising, passing a fluid stream upwardly through said bed in contact with said solids at such a velocity that the bed of solids is densely fluidized by it in said chamber and meanwhile materially retarding rapid top to bottom and bottom to top mixing of the said solids and top to bottom mixing of said stream in said bed by whirling (rotating) a plurality of separate, vertically spaced disk-like elements of a non-propelling type in substantially horizontal planes in a plurality of different levels in said bed, and discharging the said fluidizing stream from above said bed.

2. The process defined in claim 1 in which said solids are substantially continuously fed into said bed at substantially one zone thereof and substantially continuously discharged from a different zone thereof while maintaining a substantially constant depth of the bed in said chamber.

3. The process defined in claim 1 in which the solids are catalyst solids and in which chemical reaction is caused to occur in said fluid stream by virtue of its contact with said catalyst solids as said stream passes upwardly through said bed and as said catalyst solids pass downwardly from one stratum to a lower one through the bed, said stream initially containing chemically reactive substance.

4. The process defined in claim 1 in which the solids are catalyst solids, in which chemical reaction occurs in said fluid stream by virtue of its contact with said catalyst solids, and in which an elevated temperature is maintained in said bed favorable for said reactions to occur by promoting exothermic reactions in said stream in said bed, said stream initially containing reactive substance.

5. The process defined in claim 1 in which at least some of the solids of said bed are caused to flow through the fluidized bed downwardly from a zone of said bed above the bottom zone thereof and are discharged from the latter zone while the deep bed is maintained in said chamber by feeding fresh (additional) solids to said bed at a controlled rate.

6. The process defined in claim 1 in which the solids and the fluid stream are introduced into said bed under superatmospheric pressure and in which a pressure of the order of 5 to 1000 lbs. gage is maintained in the said contact chamber.

7. The process defined in claim 1 in which the densely fluidized bed of solids is maintained at an elevated temperature at least in part by heat generated within said contact chamber.

8. The process of contacting small-size solids with a flowing fluid and causing chemical reaction to occur in said fluid while in contact with said solids, comprising, passing a fluid stream initially containing reactant material upwardly through and in contact with a mass of small-size contact solids while said mass is confined as a deep, upright, continuous bed in a reaction chamber, at such a velocity that the said contact solids are densely fluidized therein by said stream with a well defined top level in said chamber, meanwhile materially retarding top to bottom and bottom to top mixing of the latter solids and top to bottom mixing of reaction products in said bed by whirling (rotating) a plurality of separate disk-like elements of a non-propellant type in substantially horizontal planes in said bed which elements are spaced apart vertically in staggered arrangement on a vertical shaft in said bed, thereby promoting said reaction of said material in said stream by virtue of its contact with said contact solids as said stream passes up through said bed, and removing the stream, of altered composition, from above said bed.

9. The process of contacting small-size fluidizable solids with a flowing fluid and causing chemical reactions to occur in said fluid while in contact with said solids, comprising, passing a fluid stream initially at an elevated temperature and containing reactant material upwardly through and in contact with a mass of small-size contact solids confined as a deep, upright, continuous bed in a reaction chamber, at such a velocity that the latter solids are densely fluidized in said bed by said stream meanwhile materially retarding top to bottom and bottom to top rapid mixing of the latter solids and top to bottom mixing of fluid reaction products in said stream in said bed by whirling (rotating) a plurality of disk-like separate elements of a non-propellant type in a plurality of substantially horizontal planes in said bed which elements are spaced apart vertically on a vertical shaft in said bed thereby promoting chemical reaction of said material in said stream and simultaneously altering the composition of said contact solids, removing the fluid stream of altered composition from above said bed, substantially continuously feeding fresh contact solids to said bed adjacent one end thereof and discharging solids of altered chemical composition from adjacent the opposite end thereof at a rate adjusted to maintain a substantially constant depth of said bed in said chamber.

10. The process defined in claim 9 in which the contact-solids are fed to said bed adjacent the top thereof and the solids of altered composition are discharged adjacent the bottom of the bed.

11. The process defined in claim 9 in which the fluid stream fed to said bed initially contains hydrocarbon substance as a reactant material.

12. The process defined in claim 9 in which the fluid stream fed to said bed initially contains hydrocarbon substance and in which the solids fed to the bed are catalytic to the reaction of said hydrocarbon substance.

13. The process defined in claim 9 in which the fluid stream fed to said bed initially contains hydrocarbon substance, in which the fresh solids fed to the bed are catalytic to the reaction of said hydrocarbon substance and hot, and in which an elevated temperature favorable for the reaction of said substance is maintained in said bed at least in part by the sensible heat of the said hot solids.

14. The process defined in claim 9 in which said solids are reactive with the said reactant material and in which the compositions of both the said material and said solids are altered as the stream passes upwardly through the bed.

15. The process defined in claim 9 in which the fluid stream fed to said bed initially contains hydrocarbon substance, in which the fresh solids fed to said bed are catalytic to the reaction of said hydrobarbon substance and hot being at a temperature of the order of 700° to 1500° F., in which an elevated temperature favorable for the reaction of said substance is maintained in said bed in part by the sensible heat of said hot solids and in part by heat generated within said bed.

16. In the process of contacting small-size, fluidizable solids with a flowing fluid, by passing said fluid as a stream substantially continuously upwardly through a mass of said solids in contact with them while they are confined as a deep, continuous, upright bed in a chamber at such a velocity that the said solids are densely fluidized by it in said bed, the step comprising, rotating a plurality of separate disk-like elements of a non-propellant type, axially supported in said bed and vertically spaced apart from one another, in a plurality of substantially horizontal planes at such a velocity of rotation in said bed that rapid top to bottom and bottom to top mixing of the fluidized solids in said bed is materially minimized.

17. The process defined in claim 16 in which the solids are so disposed in said bed in the chamber that the stream passing up through said bed passes serially through the bottom zone and through an upper expanded zone thereof above the bottom zone before exiting from said bed, thus promoting selective separation of the less buoyant solids in the uppermost zone of said bed.

18. The process of contacting small-size comminuted solids with a flowing fluid while they are confined as a deep, upright continuous single bed in a contact chamber, comprising, passing a fluid stream upwardly through said bed at such a velocity that said solids are densely fluidized in said bed by said fluid stream, introducing into said bed between the top and bottom thereof a stream of said comminuted solids which are of different buoyancy of substantially uniform size, promoting sharp classification of the comminuted solids with the most buoyant solids collecting in the top zone of said bed and the least buoyant solids in the bottom zone thereof, removing the latter solids from said bottom zone, separately removing the most buoyant solids from said top zone, so controlling the rate of feed of the comminuted solids and the rates of discharge of solids from the said top and bottom zones that the depth of bed in said chamber is kept substantially constant, and removing the fluid stream, exiting from the top of said bed, from above said bed; said sharp classification being promoted by rotating a plurality of separate disk-like segments (elements) of a non-propellant type in a plurality of different substantially horizontal planes in said bed which elements are spaced apart vertically in said bed.

19. In an apparatus for contacting fluids with finely divided fluidized solids comprising an upright closed chamber, means for solids introduction into said chamber, means for fluid reactant and fluidizing medium introduction into said chamber, the improvement which comprises an upright substantially vertical rotatable shaft in said chamber, having a plurality of separate vertically spaced, horizontally disposed disk-like elements of a non-propellant type attached thereto in a staggered arrangement, and means for rotating said shaft about its axis.

20. The process of contacting small-size fluidizable, contact-solids with a flowing fluid, comprising, passing said fluid upwardly as a stream through a single, deep, continuous bed of said solids, while they are confined in a contact chamber, at such a velocity that said solids are densely fluidized in said chamber by said stream, rotating a plurality of separate disk-like elements of a non-propellant type, axially supported in said bed and spaced apart vertically from one another, in a plurality of substantially horizontal planes at such a velocity of rotation in the fluidized bed that rapid top to bottom and bottom to top mixing of said solids in said bed is materially minimized, substantially continuously feeding a supply of contact-solids to an upper zone of said bed and discharging substantially continuously from adjacent the bottom of said bed solids which have been contacted by said fluid at a rate adapted to maintain said deep bed in said chamber, meanwhile discharging said fluid stream from above said bed substantially continuously, thereby contacting said stream with said solids as said solids pass downwardly through a plurality of strata of said bed in which strata the up and down motion of said fluidized solids is interrupted frequently for brief periods of time.

21. The process defined in claim 20 in which the fluid stream contains reactant substance adapted to be reacted catalytically and in which the solids comprise catalytic material adapted to promote chemical reaction of said substance in said stream as said stream passes through the bed of fluidized solids.

22. The process defined in claim 21 in which an elevated temperature favorable for the reaction of said substance is maintained in the fluidized bed of solids.

References Cited in the file of this patent

UNITED STATES PATENTS

| | | |
|---|---|---|
| 2,079,158 | Rachat | May 4, 1937 |
| 2,256,969 | Barr | Sept. 24, 1941 |
| 2,370,816 | Schanberg | Mar. 6, 1945 |
| 2,419,097 | Stratford et al. | Apr. 15, 1947 |
| 2,540,706 | Beck et al. | Feb. 6, 1951 |